United States Patent [19]

Harbauer et al.

[11] Patent Number: 5,695,889
[45] Date of Patent: Dec. 9, 1997

[54] ELECTRIC BATTERY WITH PROTECTION AGAINST ELECTROLYTE LEAKAGE

[75] Inventors: Werner Harbauer, Kuernach; Mathias Ruland, Wiesentheid; Holger Jansen, Amberg, all of Germany

[73] Assignee: Siemens Aktiengesellschaft, München, Germany

[21] Appl. No.: 644,146

[22] Filed: May 10, 1996

Related U.S. Application Data

[63] Continuation of Ser. No. 235,722, Apr. 29, 1994, abandoned.

[30] Foreign Application Priority Data

Apr. 30, 1993 [EP] European Pat. Off. .............. 93107100

[51] Int. Cl.⁶ ..................................................... H01M 6/22
[52] U.S. Cl. ................................................ 429/72; 429/154
[58] Field of Search ................................. 429/70, 72, 154, 429/178, 190, 198, 218

[56] References Cited

U.S. PATENT DOCUMENTS

| | | | |
|---|---|---|---|
| 3,877,990 | 4/1975 | Laethem et al. | 136/86 A |
| 4,379,814 | 4/1983 | Tsien et al. | 429/42 |
| 4,400,448 | 8/1983 | Einstein et al. | 429/34 |
| 4,455,358 | 6/1984 | Graham et al. | 429/190 |

FOREIGN PATENT DOCUMENTS 1944230  4/1931  Germany.

*Primary Examiner*—M. Nuzzolillo
*Attorney, Agent, or Firm*—Kenyon & Kenyon

[57] ABSTRACT

An electric battery, for example, a zinc-bromine battery for an automobile, is protected against leakage of electrolyte, in particular against bromine liberated during a crash. For this purpose, the reservoirs provided for the electrolyte are filled with a sponge-like material that stores the electrolyte. Alternatively, or in addition, the reservoirs are surrounded by a protective sheathing made of a material that binds the escaping electrolyte, in particular through chemical reaction.

16 Claims, 1 Drawing Sheet

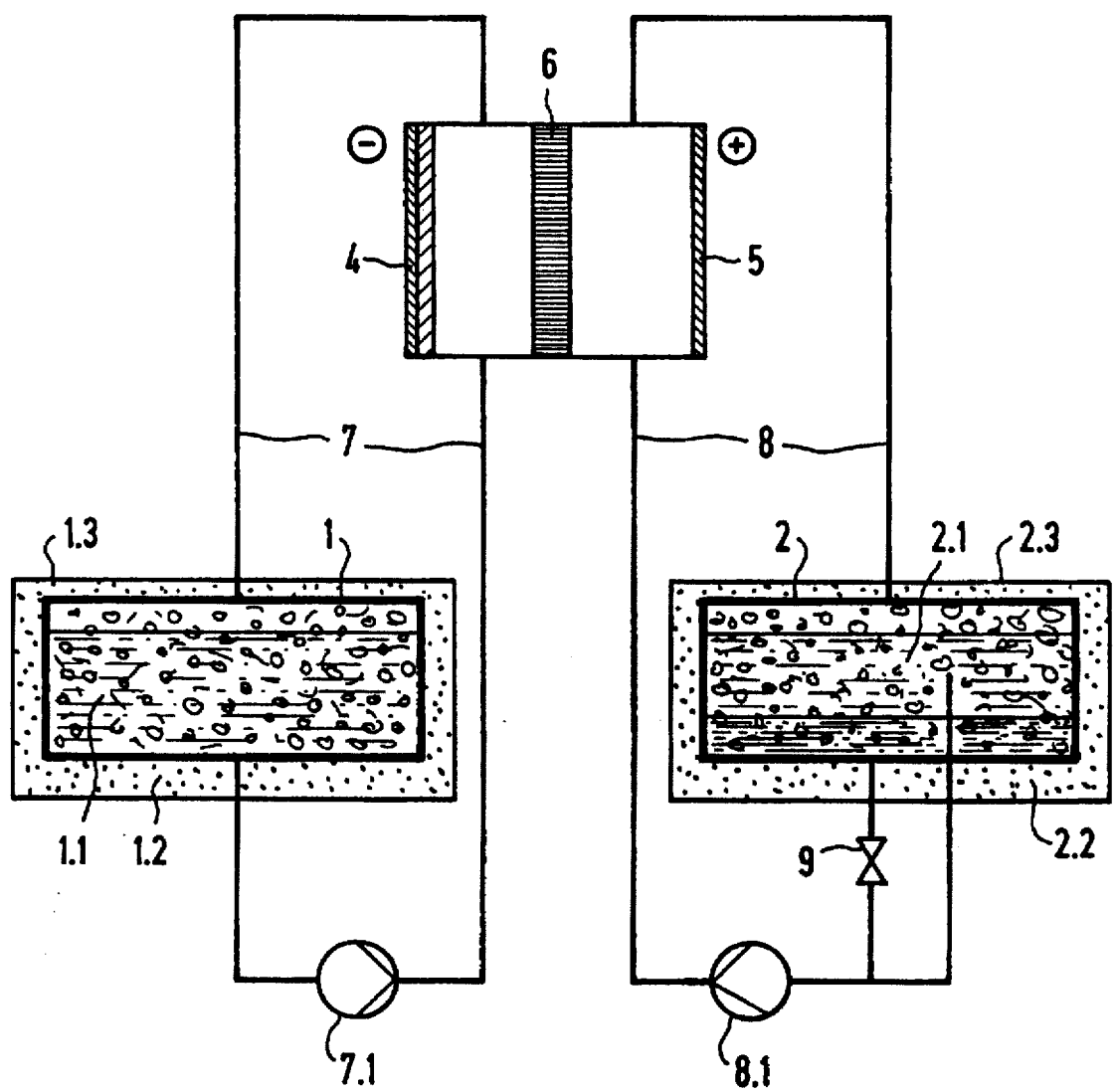

ELECTRIC BATTERY WITH PROTECTION AGAINST ELECTROLYTE LEAKAGE

This application is a continuation application Ser. No. 08/235,722, filed on Apr. 29, 1994, now abandoned.

BACKGROUND OF THE INVENTION

1. Field of the Invention

The invention relates to an electric battery, in particular a zinc-bromine battery.

2. Description of Related Art

U.S. Pat. No. 4,440,448 discloses a zinc-bromine battery for application, inter alia, in a battery-operated vehicle. For protection in the event of a crash, it provides leak-resistant compartments that are nested within each other, a first inner compartment being provided for a bromine-rich charge, a second compartment surrounding the first inner compartment containing a first electrolyte, a third compartment surrounding both aforementioned compartments and containing a second electrolyte, and a fourth outer casing surrounding the aforementioned compartments.

German Patent No. DE 39 16 491 discloses protecting electrolyte-conducting conduits in the case of an electric battery, in the event of leakage, by placing them in a microporous, hydrophobic compartment to spatially isolate them from the central battery unit. In the event of leakage, this compartment allows only the battery gases to escape into the environment, but it holds back the corrosive fluid electrolyte.

SUMMARY OF THE INVENTION

The electric battery of the invention provides adequate safety, even in the event of electrolyte leakage, particularly in a crash situation. The battery of the invention is based on the one disclosed in U.S. Pat. No. 4,440,448. However, in accordance with the invention, the battery is produced by providing sponge-like filling material to contain the respective electrolyte in the reservoirs, and/or by surrounding each of the reservoirs with a protective sheathing made of a material that bonds the electrolyte or its gaseous depositions, in particular through chemical reaction, when the electrolyte in question leaks out of the respective reservoir.

Should the reservoir crack or burst open, the sponge-like filling material containing the electrolyte ensures that the liquid is not immediately and completely liberated, and that dangerous bromine gas, at least bromine gas of a higher concentration, cannot escape. The protecting sheathing made of a chemically bonding material causes the gas, in some instances only the partially escaping gas, to bond. On the one hand, this guarantees adequate safety in the event of a crash. On the other hand, in normal operation, it prevents an irritating gas smell that would otherwise still be noticeable, in spite of encapsulation of the battery.

Other advantageous refinements of the invention will be clarified in greater detail with reference to the following exemplified embodiment.

BRIEF DESCRIPTION OF THE DRAWINGS

FIG. 1 depicts a zinc-bromine battery in accordance with the invention.

DETAILED DESCRIPTION OF THE INVENTION

By means of a first pump 7.1, an aqueous zinc-bromide solution is pumped as an electrolyte out of a first reservoir 1 via a first conduit circulation circuit 7 into a first electrode compartment containing a first electrode 4. By means of a second pump 8.1, an aqueous zinc-bromide solution having an organic bromine-complexing component is pumped as an electrolyte out of a second reservoir 2 via a second conduit circulation circuit 8 into an electrode compartment containing a second electrode 5. The two electrode compartments are separated by a separator-spacer 6, whose purpose is to prevent the movement of anions, such as bromine ions, from the cathode part to the anode part. When the battery is charged, zinc is deposited onto the first electrode 4 (cathode); the bromine forming on the second electrode 5 (anode) reacts with the complexing component of the electrolyte while forming an essentially water-insoluble oil that is heavier than water and that settles on the bottom of the second reservoir 2 as a bottom product. When the battery is discharged, a valve 9 regulates the oil to admix it with the electrolyte in the second conduit circulation circuit 8.

To guarantee adequate safety in case of a leaky first reservoir 1 or second reservoir 2, or rather to ward off an unpleasant odor caused by bromine vapors that can sometimes otherwise be smelled, in spite of the encapsulation of the battery, the invention provides for the reservoirs 1 and 2 to be surrounded by a protective sheathing 1.2 and 2.2, respectively, of a material that bonds the electrolyte, or rather its gaseous deposition, in particular through chemical reaction. To the extent that is possible, this material is molded in a grainy or beaded form, and preferably has a large surface area. According to one refinement of the invention, sodium thiosulfate or sodium sulfite are provided for this material. The protective sheathing 1.2 and 2.2 made of the bonding material is advantageously imperviously surrounded by another protective sheathing 1.3 and 2.3, respectively, of a tear-resistant, but suitably expandable film.

Should leaks occur, for example, due to cracks in the reservoirs 1 or 2 or in the event of a crash, to prevent any electrolyte from leaking at all, or to reduce the leakage amount to a harmless minimum, in accordance with the invention each reservoir 1 and 2 is filled with a sponge-like filling material 1.1 and 2.1, respectively. This filling material soaks up the electrolyte to such an extent that, under field conditions and under a partial vacuum due to the pump action of the pumps 7.1 and 8.1, the electrolyte can be forced into the conduit circulation circuit 7, 8. However, in the event of a crash which would cause leaks in the reservoirs 1 and 2, the electrolyte can be completely retained in the sponge-like filling material or, at most, can escape drop by drop in harmless quantities.

What is claimed is:

1. An electric battery having caustic electrolyte stored in reservoirs, which electrolyte reacts caustically upon emergence from the reservoirs, comprising: a first reservoir containing a positive electrolyte, a second reservoir containing a negative electrolyte, a filling material capable of soaking up caustic electrolyte containing the respective electrolytes in each of the reservoirs, and a protective sheathing surrounding each of the reservoirs wherein the sheathing is made of a material that binds the electrolyte or its gaseous depositions when the electrolyte emerges from the respective reservoir.

2. The electric battery according to claim 1 which is a zinc-bromine battery.

3. An electric battery having caustic electrolyte stored in reservoirs, which electrolyte reacts caustically upon emergence from the reservoirs, comprising: a first reservoir containing a positive electrolyte, a second reservoir containing a negative electrolyte and a protective sheathing surrounding each reservoir, each sheathing comprising sodium sulphite or sodium thiosulfate which binds the electrolyte which it surrounds or its gaseous depositions when the electrolyte leaks out of the respective reservoir.

4. The electric battery according to claim 3, wherein the sheathing material is in a grainy or beaded form.

5. The electric battery according to claim 3, wherein each protective sheathing is surrounded by a protective sheathing of a tear-resistant, impervious film.

6. The electric battery according to claim 4, wherein each protective sheathing is surrounded by a protective sheathing of a tear-resistant, impervious film.

7. The electric battery according to claim 3, which is a zinc-bromine battery.

8. The electric battery according to claim 1, further comprising a protective sheathing surrounding each reservoir, each sheathing being of a material that binds the electrolyte which is surrounds or its gaseous depositions when the electrolyte leaks out of the respective reservoir.

9. An electric battery having caustic electrolyte stored in reservoirs, which electrolyte reacts caustically upon emergence from the reservoirs, comprising: a first reservoir containing a positive electrolyte, a second reservoir containing a negative electrolyte and a protective sheathing surrounding each reservoir, each sheathing comprising sodium thiosulfate which binds the electrolyte which it surrounds or its gaseous depositions when the electrolyte leaks out of the respective reservoir.

10. The electric battery according to claim 9, wherein the sheathing material is in a grainy or beaded form.

11. An electric battery having caustic electrolyte stored in reservoirs, which electrolyte reacts caustically upon emergence from the reservoirs, comprising: a first reservoir containing a positive electrolyte, a second reservoir containing a negative electrolyte and a protective sheathing surrounding each reservoir, each sheathing comprising sodium sulfite which binds the electrolyte which it surrounds or its gaseous depositions when the electrolyte leaks out of the respective reservoir.

12. The electric battery according to claim 11, wherein the sheathing material is in a grainy or beaded form.

13. The electric battery according to claim 9, wherein each protective sheathing is surrounded by a protective sheathing of a tear-resistant, impervious film.

14. The electric battery according to claim 10, wherein each protective sheathing is surrounded by a protective sheathing of a tear-resistant, impervious film.

15. The electric battery according to claim 11, wherein each protective sheathing is surrounded by a protective sheathing of a tear-resistant, impervious film.

16. The electric battery according to claim 12, wherein each protective sheathing is surrounded by a protective sheathing of a tear-resistant, impervious film.

* * * * *